(12) United States Patent
Yamamura et al.

(10) Patent No.: US 10,801,463 B2
(45) Date of Patent: Oct. 13, 2020

(54) INTERNAL COMBUSTION ENGINE

(71) Applicant: HONDA MOTOR CO., LTD., Minato-ku, Tokyo (JP)

(72) Inventors: Satoshi Yamamura, Wako (JP); Mitsuru Sugimoto, Wako (JP); Noriyuki Takegata, Wako (JP); Hisao Uozumi, Wako (JP); Makoto Yamazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/363,293

(22) Filed: Mar. 25, 2019

(65) Prior Publication Data
US 2019/0316559 A1 Oct. 17, 2019

(30) Foreign Application Priority Data

Apr. 16, 2018 (JP) .................................. 2018-078618

(51) Int. Cl.
| | |
|---|---|
| *F02P 5/152* | (2006.01) |
| *F02F 1/14* | (2006.01) |
| *F01P 3/02* | (2006.01) |
| *F02F 1/16* | (2006.01) |
| *F02F 1/10* | (2006.01) |
| *F02D 35/02* | (2006.01) |
| *G01L 23/22* | (2006.01) |

(52) U.S. Cl.
CPC ............... *F02P 5/1522* (2013.01); *F01P 3/02* (2013.01); *F02D 35/025* (2013.01); *F02F 1/14* (2013.01); *F02F 1/16* (2013.01); *G01L 23/227* (2013.01); *F02F 2001/106* (2013.01)

(58) Field of Classification Search
CPC ......... F01P 3/02; F01P 5/1522; F02D 35/025; F02F 1/14; F02F 1/16
See application file for complete search history.

(56) References Cited

FOREIGN PATENT DOCUMENTS

| | | | |
|---|---|---|---|
| JP | S6252255 U | | 4/1987 |
| JP | 2016142251 A | * | 8/2016 |
| JP | 6044616 B2 | | 12/2016 |

* cited by examiner

*Primary Examiner* — Kevin A Lathers
(74) *Attorney, Agent, or Firm* — Armstrong Teasdale LLP

(57) ABSTRACT

An internal combustion engine includes an anisotropic thermal conductivity member (37, 51) provided on a wall surface defining a cylinder or a wall surface of a cooling water passage on a side of the cylinder, a thermal conductivity of the anisotropic thermal conductivity member in an axial direction of the cylinder being higher than a thermal conductivity of the anisotropic thermal conductivity member in a radial direction of the cylinder, and a thermally insulating member (38. 52) provided on an outer surface of the anisotropic thermal conductivity member with respect to the radial direction of the cylinder.

5 Claims, 6 Drawing Sheets

INTERNAL COMBUSTION ENGINE

TECHNICAL FIELD

The present invention relates to an internal combustion engine.

BACKGROUND OF THE INVENTION

It is known to place a thermally insulating material around the cylinder of an internal combustion engine to reduce the dissipation of heat to the cylinder block for the purpose of reducing the cooling loss of the internal combustion engine. See JPS62-52255U, for instance. However, when the dissipation of heat to the cylinder block is suppressed, the temperature rise of the cooling water and oil is suppressed. As a result, the heat from the cooling water may become less available for heating the cabin of the vehicle or the like. To overcome this problem, it has been proposed to form a cylinder sleeve by using a material demonstrating a higher thermal conductivity in the axial direction of the cylinder than in the radial direction of the cylinder, and to provide a cooling water passage around an upper end part of the cylinder sleeve. See JP6044616B, for instance. According to this prior proposal, the heat transferred from the combustion gas and the piston to the cylinder sleeve is conducted from the lower end side thereof to the upper end side thereof to be eventually transferred to the cooling water circulating in the cooling water passage. Therefore, the dissipation of heat from the lower end part of the cylinder sleeve is reduced so that the cooling loss of the engine can be reduced. Meanwhile, the cooling water can be appropriately raised in temperature so that the heat for warming the cabin of the vehicle can be adequately obtained from the cooling water.

However, according to the internal combustion engine disclosed in JP6044616B, since the cooling water passages has a relatively small vertical width corresponding to the upper end part of the cylinder sleeve, the cylinder may not be adequately cooled particularly under a high load condition of the internal combustion engine. Therefore, the engine may become prone to knocking, and the thermal efficiency may be reduced. When the flow rate of the cooling water is increased with the aim of promoting the cooling of the cylinder sleeve under a high load condition, the pumping loss undesirably increases. When the vertical width of the cooling water passage effective for removing heat from the upper end part of the cylinder sleeve is increased, the cooling loss is increased, and the thermal efficiency is impaired.

SUMMARY OF THE INVENTION

In view of such a problem of the prior art, a primary object of the present invention is to increase the thermal efficiency of an internal combustion engine.

According to the present invention, such an object can be accomplished by providing an internal combustion engine, comprising: a cylinder block (2) defining a cylinder (6) receiving a piston (17) and a cooling water passage (30) provided radially outwardly of the cylinder; an anisotropic thermal conductivity member (37, 51) provided on a wall surface defining the cylinder or a wall surface of the cooling water passage on a side of the cylinder, a thermal conductivity of the anisotropic thermal conductivity member in an axial direction of the cylinder being higher than a thermal conductivity of the anisotropic thermal conductivity member in a radial direction of the cylinder; and a thermally insulating member (38. 52) provided on an outer surface of the anisotropic thermal conductivity member with respect to the radial direction of the cylinder.

Since the combustion takes place in the combustion chamber of the internal combustion engine when the piston is near the top dead center thereof, the upper part of the cylinder wall tends to get higher in temperature owing to the heat transferred from the combustion gas and the piston. This heat is then conducted by the anisotropic thermal conductivity member from the upper part of the cylinder to the lower part of the cylinder. As a result, the upper part of the cylinder is actively cooled while the lower part of the cylinder is warmed. In other words, the cylinder is warmed over the entire length in a relatively uniform manner. Therefore, the viscosity of the lubricating oil is lowered so that the frictional loss of the engine can be minimized. Under a high load condition of the engine, a significant part of the heat generated in the cylinder is still transferred to the cooling water in the cooling water passage in the radial direction through the anisotropic thermal conductivity member and thermally insulating member so that an excessive temperature rise in the cylinder wall can be avoided, and knocking of the engine can be minimized. Owing to these factors, the thermal efficiency of the engine can be improved.

Preferably, the cooling water passage has a greater length in the axial direction of the cylinder than a stroke length of the piston.

Thereby, the excessive rise in the temperature of the cylinder wall surface can be avoided under a high load condition of the engine, and the occurrence of knocking can be minimized.

Preferably, the anisotropic thermal conductivity member and the thermally insulating member each have a greater length in the axial direction of the cylinder than the stroke length of the piston.

Thereby, a wide range of the cylinder wall down to the lower part of the cylinder wall can be warmed in a favorable manner.

Preferably, the anisotropic thermal conductivity member and the thermally insulating member each have an upper end located above a top ring of the piston at a top dead center, and a lower end located below the top ring of the piston at a bottom dead center.

Thereby, the temperature distribution in the cylinder wall can be made relatively uniform over the entire length of the cylinder so that the knocking of the engine can be avoided owing to a relatively lower temperature in the upper part of the cylinder, and the lubricating oil can be favorably warmed owing to a relatively high temperature in the lower part of the cylinder.

Preferably, the anisotropic thermal conductivity member is bonded to the wall surface of the cooling water passage on the side of the cylinder.

Thereby, the anisotropic thermal conductivity member can be attached to the wall surface of the cooling water passage by using a highly simple arrangement. Furthermore, the anisotropic thermal conductivity member can be properly installed without requiring the configuration of the cylinder block to be modified from the existing design.

Preferably, the thermally insulating member is bonded to the anisotropic thermal conductivity member.

Thereby the thermally insulating member can be placed on the anisotropic thermal conductivity member and to the cylinder block by using a highly simple arrangement.

Preferably, the anisotropic thermal conductivity member is provided with a cylindrical configuration and is formed as a cylinder sleeve in sliding contact with the piston.

Thereby, the anisotropic thermal conductivity member can be mounted to the cylinder block by using a highly simple structure. It is also possible to attach the anisotropic thermal conductivity member to the cylinder sleeve in advance, and then install the cylinder sleeve in the cylinder block.

In such a case, the thermally insulating member may be provided on an outer circumferential surface of the cylinder sleeve.

Thereby, the thermally insulating member can be mounted to the anisotropic thermal conductivity member or the cylinder sleeve by using a highly simple structure.

The present invention thus increases the thermal efficiency of an internal combustion engine.

BRIEF DESCRIPTION OF THE DRAWINGS

Now the present invention is described in the following with reference to the appended drawings, in which.

DETAILED DESCRIPTION OF THE PREFERRED EMBODIMENT(S)

First Embodiment

Figure 1:
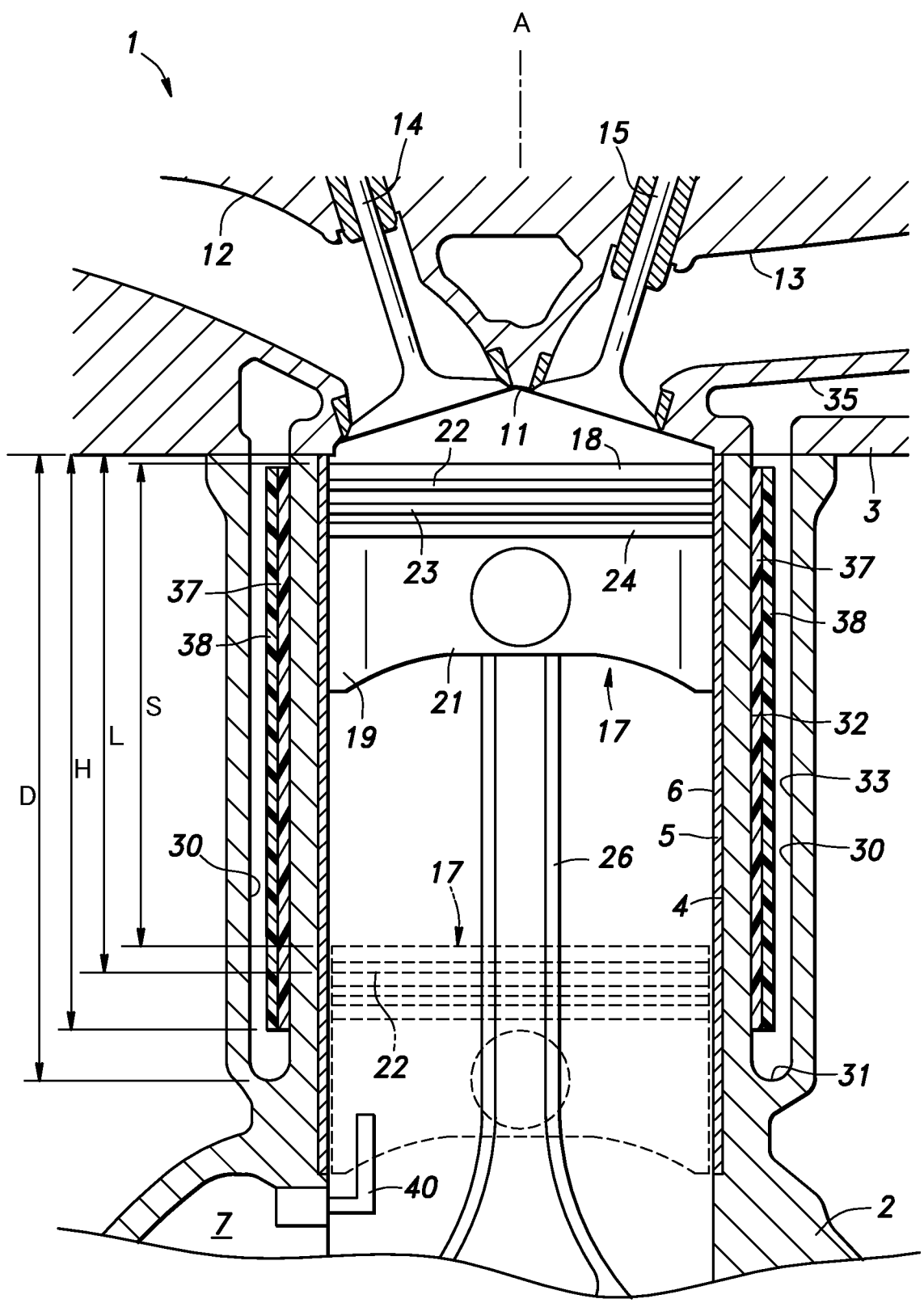
FIG. 1 is a sectional view of an internal combustion engine according to a first embodiment of the present invention.

FIG. 1 shows the first embodiment of the present invention.

The internal combustion engine 1 consists of a four stroke engine, and includes a cylinder block 2 and a cylinder head 3 fastened to an upper end of the cylinder block 2. A cylinder bore 4 having a circular cross section and opening at the upper end face of the cylinder block 2 is formed in the cylinder block 2. A cylindrical cylinder sleeve 5 is fixedly fitted in the cylinder bore 4. The cylinder sleeve 5 may be fixed to the cylinder bore 4 by press-fitting or by casting-in. A cylinder 6 defining a combustion chamber is formed by the inner circumferential surface of the cylinder sleeve 5. The axis of the cylinder 6 is referred to as cylinder axis A. The lower end of the cylinder bore 4 communicates with a crank chamber 7 defined in a lower part of the cylinder block 2.

A part of the cylinder head 3 opposing the upper end of the cylinder 6 is recessed upward so as to form a combustion chamber ceiling portion 11. The combustion chamber ceiling portion 11 is provided with two intake ports 12 and two exhaust ports 13 in such a manner that the two intake ports 12 are arranged on an intake side of the combustion chamber ceiling portion 11 and the two exhaust ports 13 are arranged on an exhaust side of the combustion chamber ceiling portion 11 which is opposite to the intake side. An open end of each intake port 12 is provided with an intake valve 14, and an open end of each exhaust port 13 is provided with an exhaust valve 15 in a per se known manner.

A piston 17 is received in the cylinder 6 so as to reciprocate along the cylinder axis A. The piston 17 has a disk-shaped crown portion 18, a pair of skirt portions 19 extending downward from the diagonally opposing peripheral portions of the crown portion 18, a pair of connecting wall portions 21 connecting the corresponding side edges of the respective skirt portions 19. A first annular groove, a second annular groove, and a third annular groove (not numbered in the drawings) extending in the circumferential direction are formed in the outer periphery of the crown portion 18 in that order from the top. The top ring 22 serving as a compression ring is fitted in the first annular groove, a second ring 23 also serving as a compression ring is fitted in the second annular groove, and an oil ring 24 is fitted in the third annular groove. The piston 17 is in sliding contact with the inner circumferential surface of the cylinder sleeve 5 at the top ring 22, the second ring 23 and the oil ring 24.

The piston 17 is connected to a crankshaft (not shown) via a connecting rod 26. The piston 17 reciprocates with respect to the cylinder 6 with a predetermined stroke length S along the cylinder axis A. In FIG. 1, the piston 17 at the top dead center is indicated by a solid line, and the piston 17 at the bottom dead center is indicated by a broken line. The distance between the upper end surface (gasket surface: Ga surface) of the cylinder block 2 and the lower end surface of the top ring 22 when the piston 17 is at the bottom dead center is defined as a BDC top ring distance L.

In the cylinder block 2, a cooling water passage 30 (water jacket) is provided radially outward of the cylinder bore 4, or in other words, surrounds the cylinder bore 4. The cooling water passage 30 also extends vertically in parallel with the cylinder axis A, and opens at the upper end surface of the cylinder block 2. More specifically, the cooling water passage 30 is recessed deeply downward in an annular shape from the upper end surface of the cylinder block 2, and has a passage bottom wall surface 31 defining the lower bottom surface of the cooling water passage 30. The lateral boundary of the cooling water passage 30 is defined by a passage inner wall surface 32 facing the cooling water passage 30 from the side of the cylinder 6, and a passage outer wall surface 33 facing the cooling water passage 30 from the side remote from the cylinder 6.

The distance from the upper end surface of the cylinder block 2 to the passage bottom wall surface 31, or the length of the cooling water passage 30 in the direction of the cylinder axis A is defined as the depth D of the cooling water passage 30. The depth D of the cooling water passage 30 is longer than the stroke length S of the piston 17 and longer than the BDC top ring distance L. In particular, the upper end of the cooling water passage 30 is higher than the position of the top ring 22 at the top dead center, and the lower end of the cooling water passage 30 is lower than the position of the top ring 22 at the bottom dead center.

A head side cooling water passage 35 (head side water jacket) is formed around the combustion chamber ceiling surface of the cylinder head 3, and around the exhaust port 13. The head side cooling water passage 35 opens at the lower end face of the cylinder head 3, and communicates with the upper end of the cooling water passage 30. The cooling water passage 30 and the head side cooling water passage 35 communicate with a cooling water circuit (not shown in the drawings) through which cooling water circulates.

The cylinder block 2 and the cylinder head 3 are made of aluminum alloy or cast iron. The cylinder sleeve 5 is made of cast iron.

The passage inner wall surface 32 of the cooling water passage 30 is provided with an anisotropic thermal conductivity member 37 which is made of a material having an anisotropic thermal conductivity or demonstrating two different thermal conductivities in a first direction and a second direction which is orthogonal to the first direction. Such a material may be formed, for example, by combining a resin and minute flakes of graphite filler material dispersed in the resin. The graphite filler flakes each have a basal surface formed by regularly aligned carbon atoms, and are dispersed in the resin such that the basal surfaces of the graphite filler flakes are oriented in a prescribed direction. The thermal conductivity along the basal surfaces of the graphite filler flakes is higher than that in the direction orthogonal to the basal surfaces. The resin may consist of such plastic materials as ABS resin and polyimide.

The anisotropic thermal conductivity member 37 is formed into a sheet, and the basal planes of the graphite filler flakes are arranged so as to extend along the surface of the sheet. As a result, the thermal conductivity of the anisotropic thermal conductivity member 37 in the direction along the surface of the sheet is higher than the thermal conductivity in the thickness-wise direction. The anisotropic thermal conductivity member 37 may be provided with a high flexibility.

The anisotropic thermal conductivity member 37 is placed in surface contact with the passage inner wall surface 32, for instance, by adhering or otherwise bonding the anisotropic thermal conductivity member 37 onto the passage inner wall surface 32. The anisotropic thermal conductivity member 37 is thus provided with a cylindrical shape. The thermal conductivity of the anisotropic thermal conductivity member 37 in the direction of the cylinder axis A is higher than the thermal conductivity in the radial direction of the cylinder 6. The anisotropic thermal conductivity member 37 may have a thermal conductivity of, for example, 500 to 1,000 W/mK in the direction of the cylinder axis A, and a thermal conductivity of, for example, 10 to 50 W/mK in the radial direction of the cylinder 6. The anisotropic thermal conductivity member 37 preferably has a thermal conductivity in the direction of the cylinder axis A which is 20 to 50 times the thermal conductivity in the radial direction of the cylinder 6. The anisotropic thermal conductivity member 37 extends in the direction of the cylinder axis A, and extends in the circumferential direction of the cylinder 6 so as to surround the cylinder 6.

A thermally insulating member 38 is placed on the radially outer side surface (the side opposite to or remote from the cylinder 6) of the anisotropic thermal conductivity member 37 in the radial direction of the cylinder 6. The thermally insulating member 38 is formed in a sheet form and is laid onto the outer circumferential surface of the anisotropic thermal conductivity member 37. The thermally insulating member 38 may be formed of a material including a nanoporous material such as aerosilica gel, for example. The thermal conductivity of the thermally insulating member 38 may be, for example, 0.01 to 0.1 W/mK. The thermally insulating member 38 extends both in the direction of the cylinder axis A and in the circumferential direction of the cylinder 6 along the outer circumferential surface of the anisotropic thermal conductivity member 37, and thus surrounds the cylinder 6 via the anisotropic thermal conductivity member 37. The thermally insulating member 38 may be adhered or otherwise bonded to the anisotropic thermal conductivity member 37 by, for example, using an adhesive agent. The outer surface of the thermally insulating member 38 faces the passage outer wall surface 33 via a gap. As a result, the cooling water can flow between the outer surface of the thermally insulating member 38 and the passage outer wall surface 33.

The length (vertical length) of the anisotropic thermal conductivity member 37 in the direction of the cylinder axis A is defined as the length H of the anisotropic thermal conductivity member 37. In the present embodiment, the length (vertical length) of the thermally insulating member 38 in the direction of the cylinder axis A is equal to the length H of the anisotropic thermal conductivity member 37, and the upper end and the lower end of the thermally insulating member 38 substantially coincide with the upper end and the lower end of the anisotropic thermal conductivity member 37, respectively. The length H of the anisotropic thermal conductivity member 37 is selected to be longer than the stroke length S of the piston 17, and shorter than the depth D of the cooling water passage 30 (S<H<D). The upper ends of the anisotropic thermal conductivity member 37 and the thermally insulating member 38 are preferably located above the top ring 22 when the piston 17 is at the top dead center. It is also preferable that upper ends of the anisotropic thermal conductivity member 37 and the thermally insulating member 38 are spaced from the upper end surface of the cylinder block 2 by a certain gap. As a result, the upper end part of the passage inner wall surface 32 can directly contact the cooling water flowing through the cooling water passage 30. Further, the upper edge of the anisotropic thermal conductivity member 37 can contact the cooling water flowing through the cooling water passage 30.

The lower ends of the anisotropic thermal conductivity member 37 and the thermally insulating member 38 are preferably positioned lower than the top ring 22 when the piston 17 is at the bottom dead center. It is also preferable that the lower ends of the anisotropic thermal conductivity member 37 and the thermally insulating member 38 are positioned above the passage bottom wall surface 31 by a certain gap. As a result, the lower end part of the passage inner wall surface 32 can directly contact the cooling water flowing through the cooling water passage 30. Further, the lower edge of the anisotropic thermal conductivity member 37 can contact the cooling water flowing through the cooling water passage 30.

The upper ends of the anisotropic thermal conductivity member 37 and the thermally insulating member 38 are positioned so as to coincide with each other. Further, the lower ends of the anisotropic thermal conductivity member 37 and the thermally insulating member 38 are positioned so as to coincide with each other. In other words, the anisotropic thermal conductivity member 37 and the thermally insulating member 38 are formed so as to overlap with each other.

The thickness of the anisotropic thermal conductivity member 37 is preferably 0.1 to 10 mm, and the thickness of the thermally insulating member 38 is preferably 0.1 to 10 mm. The combined thickness of the anisotropic thermal conductivity member 37 and the thermally insulating member 38 is required to be small enough not to obstruct the flow of cooling water in the cooling water passage 30.

A part of the wall of the cylinder block 2 defining the crank chamber 7 is provided with an oil jet 40 for injecting oil toward the rear surface of the piston 17 and the inner peripheral surface of the cylinder 6. The oil jet 40 is connected to an oil pump via an oil gallery formed in the cylinder block 2 in a per se known manner.

Figure 2:
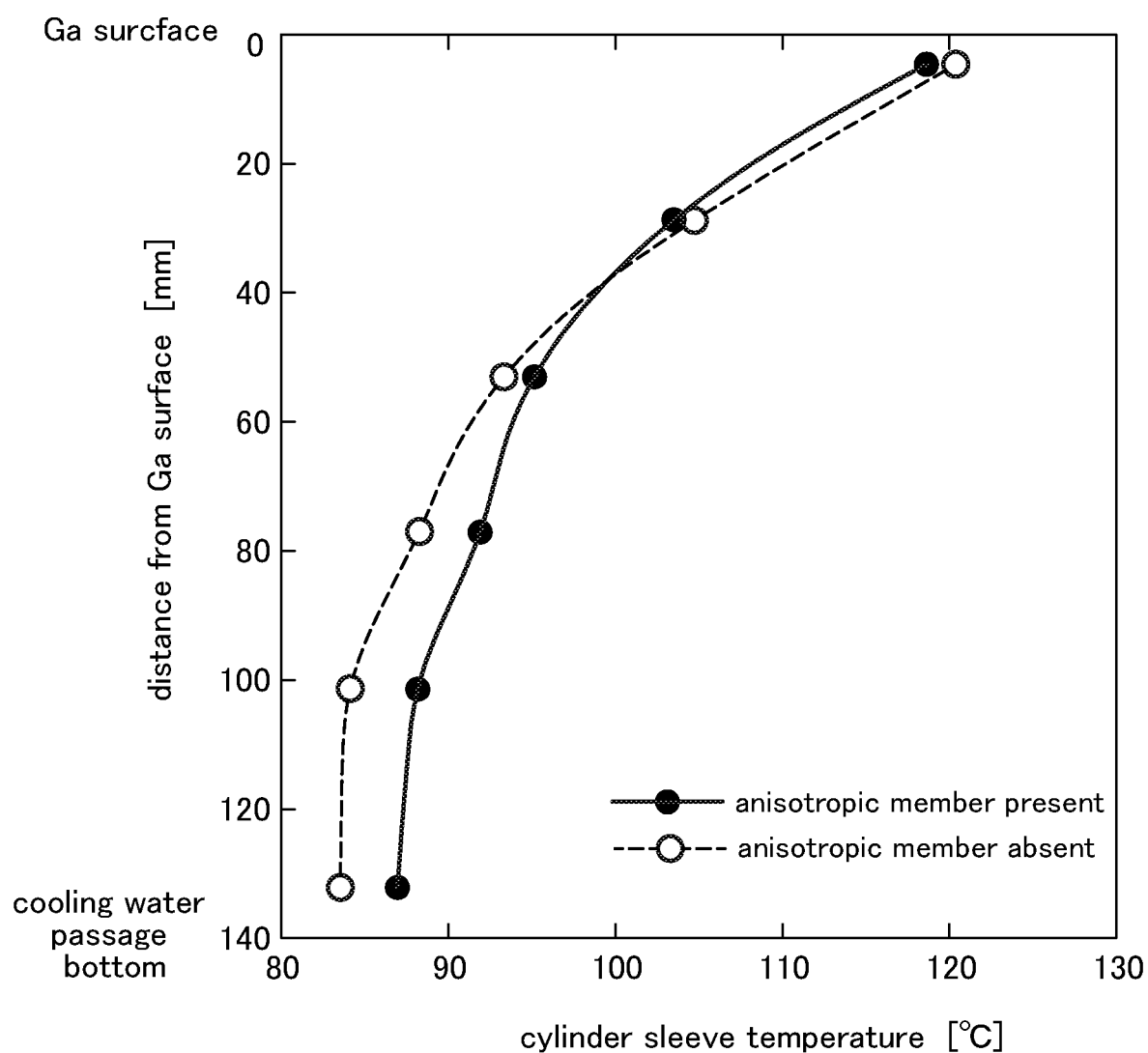
FIG. 2 is a graph showing a temperature distribution in a cylinder sleeve of the engine.

The mode of operation and primary features of the internal combustion engine 1 configured as described above will be described in the following. FIG. 2 is a graph showing the temperature distribution of the cylinder sleeve 5 of the internal combustion engine 1. This result was obtained by operating the internal combustion engine 1 at 1,500 rpm and a BMEP of 750 kPa. According to the present embodiment (the solid line in FIG. 2), the temperature distribution of the cylinder sleeve 5 as indicated by the solid line in FIG. 2 was obtained. The thermal conductivity of the anisotropic thermal conductivity member 37 in the direction of the cylinder axis A was 1000 W/mK, and the thermal conductivity in the radial direction was 20 W/mK. The anisotropic thermal conductivity member 37 had a thickness (width in the radial direction) of 7 mm, and was positioned such that the upper edge of the anisotropic thermal conductivity member 37 is lower than the upper end surface of the cylinder block 2 by 20 mm, and the lower edge of the anisotropic thermal conductivity member 37 is in a lower end part of the passage inner wall surface 32 (at a small distance from the passage bottom wall surface 31). The thermally insulating member 38 has a thickness of 7 mm, and is arranged so as to coincide with the upper edge and the lower edge of the anisotropic thermal conductivity member 37 at the upper edge and the lower edge thereof, respectively. As an example for comparison, the anisotropic thermal conductivity member 37 and the thermally insulating member 38 were omitted, and the obtained temperature distribution of the cylinder sleeve 5 is indicated by the broken line in FIG. 2. As can be seen from the graph of FIG. 2, in the internal combustion engine 1 according to the present embodiment, the temperature of the upper end part of the cylinder sleeve 5 is lower than that of the example for comparison, and the temperature of the lower end part of the cylinder sleeve 5 is higher than that of the example for comparison.

In the internal combustion engine 1, combustion occurs in the combustion chamber defined by the combustion chamber ceiling portion 11 and the upper end surface of the piston 17 when the piston 17 is in the vicinity of the top dead center. Thereafter, the piston 17 which has received the expansion force of the combustion gas moves downward, and the combustion gas expands downward. Therefore, the wall surface of the cylinder 6 receives heat from the combustion gas and the piston 17 in such a manner that the temperature in the upper part of the wall surface becomes higher than that in the lower part of the wall surface.

In the internal combustion engine 1 according to the illustrated embodiment, the heat transferred from the combustion chamber to the wall surface of the cylinder 6 is transferred to the anisotropic thermal conductivity member 37. The thermal conductivity of the anisotropic thermal conductivity member 37 in the direction of the cylinder axis A is higher than the thermal conductivity in the radial direction of the cylinder 6. As a result, in the anisotropic thermal conductivity member 37, heat is conducted in the direction of the cylinder axis A more than in the radial direction of the cylinder 6. Further, since the thermally insulating member 38 is provided radially outward of the anisotropic thermal conductivity member 37, the heat is conducted in the direction of the cylinder axis A even more substantially than in the radial direction of the cylinder 6. As a result, in the anisotropic thermal conductivity member 37, heat is preferentially conducted along the direction of the cylinder axis A from the upper part of the cylinder 6 at which the temperature is relatively high to the lower part of the cylinder 6 at which the temperature is relatively low. A part of the heat conducted to the lower end part of the anisotropic thermal conductivity member 37 is transferred to the wall surface of the cylinder 6 which is at a lower temperature so that the temperature of the corresponding part of the wall surface of the cylinder 6 is raised. The remaining heat transferred to the lower part of the anisotropic thermal conductivity member 37 is transferred to the cooling water.

In the internal combustion engine according to the example for comparison, since the anisotropic thermal conductivity member 37 and the thermally insulating member 38 are absent, the heat transferred to the cylinder sleeve 5 is mainly transferred radially outward and then to the cooling water. In particular, since the heat conduction along the direction of the cylinder axis A is not as active as in the internal combustion engine 1 of the present embodiment, the temperature difference between the upper end and the lower end of the cylinder sleeve 5 is larger than that of the internal combustion engine 1 according to the present embodiment.

In the internal combustion engine 1 according to the present embodiment, since the heat is conducted from the upper part of the cylinder sleeve 5 which is relatively high in temperature to the lower of the cylinder sleeve which is relatively low in temperature, the part ranging from the intermediate part and the lower part of the cylinder sleeve 5 rises in temperature particularly actively. As a result, the lubricating oil which flows downward along the inner circumferential surface of the cylinder sleeve 5 can be warmed in a favorable manner so that the sliding parts of the internal combustion engine 1 encounter relatively small friction owing to the reduced viscosity of the lubricating oil, and the friction loss of the internal combustion engine 1 can be minimized.

Further, since the thermally insulating member 38 is provided on the radially outer side of the thermal anisotropic material, the heat conduction in the radial direction of the cylinder 6 can be made particularly smaller than the heat conduction in the axial direction from the upper end to the lower end of the cylinder sleeve 5. Thereby, heat can be prevented from being conducted in the radial direction, and being thereby transferred to the cooling water in the cooling water passage 30 so that and the cooling loss can be minimized.

Even at the time of high load condition of the internal combustion engine 1, heat can be conducted from the upper part of the wall surface of the cylinder 6 to the lower part of the cylinder so that an excessive rise in temperature in the upper part can be avoided. As a result, engine knocking can be effectively suppressed even under a high load condition. Further, since the upper ends of the anisotropic thermal conductivity member 37 and the thermally insulating member 38 do not surround the upper end of the cylinder sleeve 5, the passage inner wall surface 32 can directly contact the cooling water, and can be cooled in a favorable manner. As a result, the temperature rise of the upper end of the cylinder sleeve 5 can be suppressed, and knocking can be suppressed.

Figure 3:
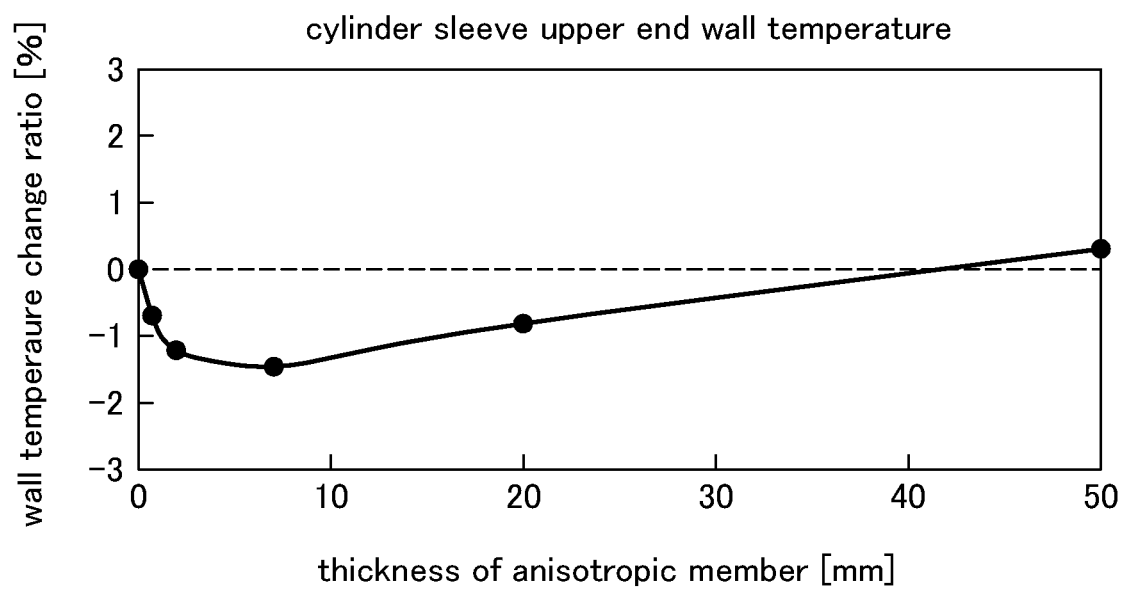
FIG. 3 is a graph showing the relationship between the thickness of an anisotropic thermal conductivity member and the temperature change ratio in an upper part of the cylinder sleeve.

FIG. 3 is a graph showing the influence of the thickness of the anisotropic thermal conductivity member 37 on the temperature of the upper end part of the cylinder sleeve 5 (at a position 30 mm below the upper end surface of the cylinder block 2). The measurement conditions are the same as those in FIG. 1. The wall temperature change ratio (%) indicates the ratio of the temperature difference between the illustrated embodiment and the example for comparison to the temperature of the illustrated embodiment. As shown in FIG. 3, when the thickness of the anisotropic thermal conductivity member 37 is 7 mm, the wall temperature change ratio at the upper end part of the cylinder sleeve 5 attains the maximum negative value (which is negative in value, and maximum in absolute value) of −1.6%. In other words, the illustrated embodiment achieves a significant reduction in the temperature in the upper end part of the cylinder sleeve 5. It also shows that the benefits of the anisotropic thermal conductivity member 37 can be obtained (possibly to a lesser extent) when the thickness of the anisotropic thermal conductivity member 37 is in the range of 0 to 40 mm. When the thickness of the anisotropic thermal conductivity member 37 is greater than 40 mm, the wall temperature change ratio at the upper end part of the cylinder sleeve 5 attains a positive value, meaning that the temperature in the upper end part of the cylinder sleeve 5 becomes higher than that of the example for comparison.

Figure 4:
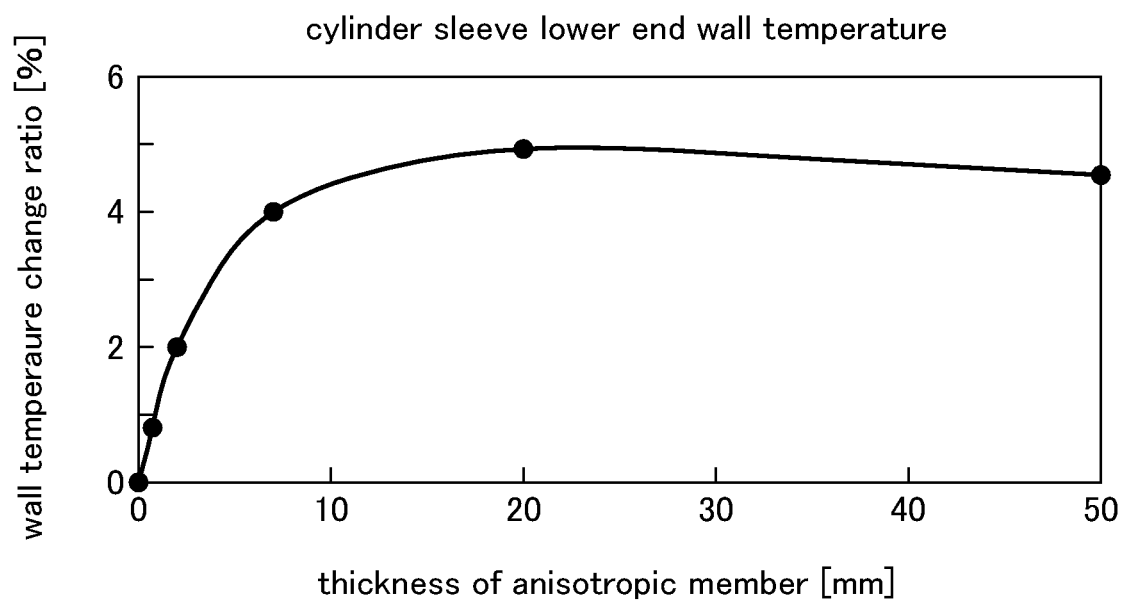
FIG. 4 is a graph showing the relationship between the thickness of the anisotropic thermal conductivity member and the temperature change ratio in a lower part of the cylinder sleeve.

FIG. 4 is a graph showing the influence of the thickness of the anisotropic thermal conductivity member 37 on the temperature of the lower end part of the cylinder sleeve 5 (at a position 135 mm below the upper end surface of the cylinder block 2). The measurement conditions are the same as those in FIG. 2. As shown in FIG. 4, the wall temperature change ratio at the lower end part of the cylinder sleeve 5 reaches +4% when the thickness of the anisotropic thermal conductivity member 37 is 7 mm, and attains the maximum positive vale (which is positive in value and maximum in absolute value) of +5% when the thickness of the anisotropic thermal conductivity member 37 is 20 mm. It also shows that the benefits of the anisotropic thermal conductivity member 37 can be obtained or in other words, a significant increase in the temperature in the lower end part of the cylinder sleeve 5 can be achieved when the thickness of the anisotropic thermal conductivity member 37 is in the range of 0 to 50 mm or even greater.

From the results shown in FIGS. 3 and 4, it can be concluded that the anisotropic thermal conductivity member 37 provides the benefit of cooling the upper end part of the cylinder sleeve 5 and warming the lower end part of the cylinder sleeve 5 when the thickness of the anisotropic thermal conductivity member 37 is in the range of 0.1 mm to 40 mm. 0.1 mm may be a practical minimum thickness of the anisotropic thermal conductivity member 37.

Second Embodiment

The internal combustion engine 50 of the second embodiment differs from that of the first embodiment in the arrangement of the anisotropic thermal conductivity member 51 and the thermally insulating member 52, but is otherwise similar to that of the first embodiment.

Figure 5:
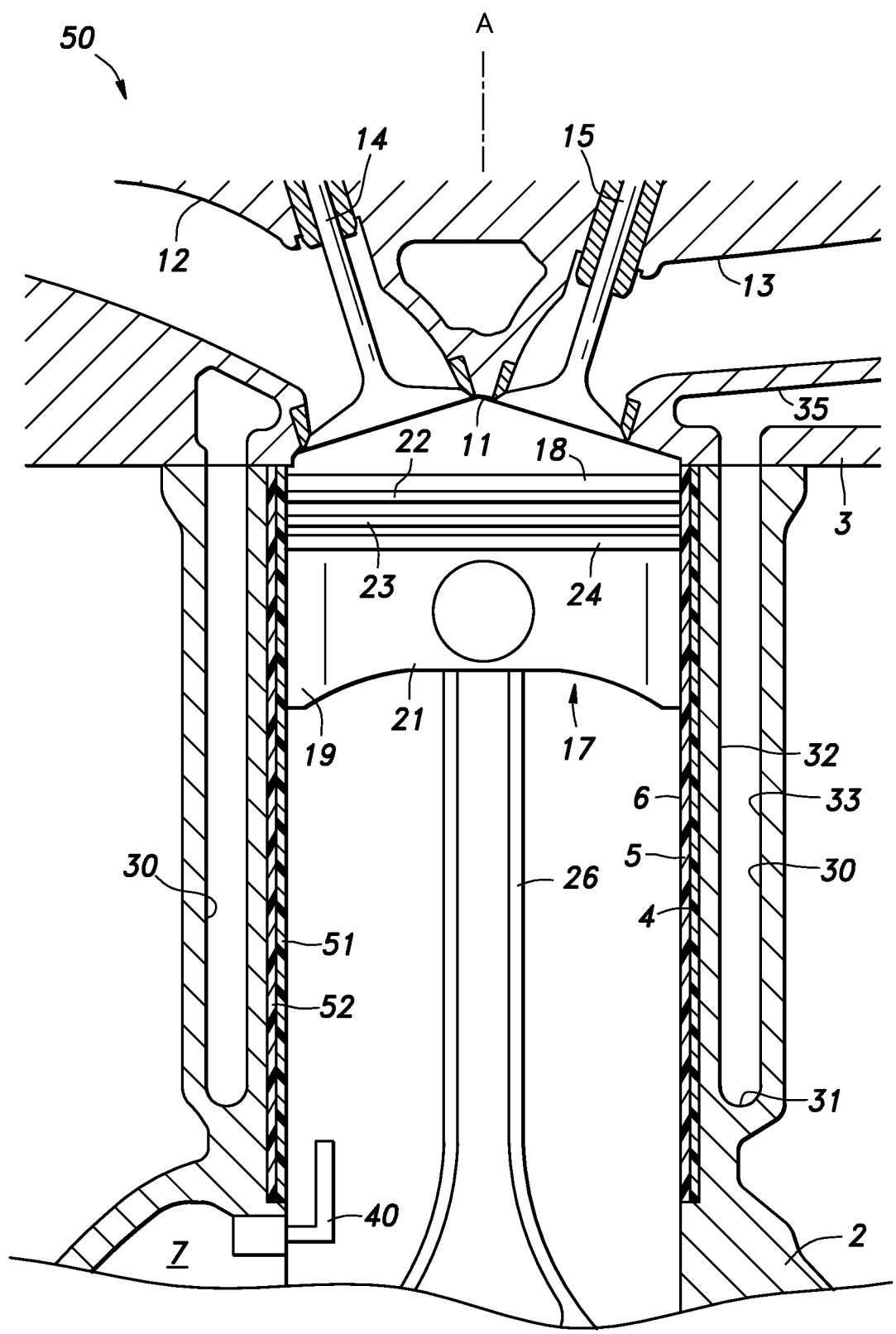
FIG. 5 is a view similar to FIG. 1 showing a second embodiment of the present invention.

As shown in FIG. 5, in the internal combustion engine 50 of the second embodiment, the cylinder sleeve 5 is formed by an anisotropic thermal conductivity member 51. The cylinder sleeve 5 has a higher thermal conductivity in the direction of the cylinder axis A than in the radial direction of the cylinder 6. In the present embodiment, the cylinder sleeve 5 is entirely formed by the anisotropic thermal conductivity member 51. In an alternate embodiment, a part of the cylinder sleeve 5 is formed by an anisotropic thermal conductivity member 51, possibly by layering with another member having no anisotropic property but favorable mechanical properties. The thermally insulating member 52 is formed in a sheet shape, and is interposed between the outer circumferential surface of the cylinder sleeve 5 and the inner circumferential surface of the cylinder bore 4 defined in the cylinder block 2.

The cylinder sleeve 5 is provided with an axial length great enough to accommodate the entire stroke of the piston 17 ranging between the top dead center and the bottom dead center. The thermally insulating member 52 is provided over the entire outer circumferential surface and the length of the cylinder sleeve 5.

In the internal combustion engine 50 of the second embodiment also, the heat received by the cylinder sleeve 5 from the combustion chamber is transferred in the axial direction from the upper part to the lower part of the cylinder sleeve 5 more actively than in the radially outward direction by the anisotropic thermal conductivity member 51 or the cylinder sleeve 5. Therefore, it is possible to raise the temperature of the lower end part of the cylinder sleeve 5 while lowering the temperature of the upper end part of the cylinder sleeve 5.

Figure 6:
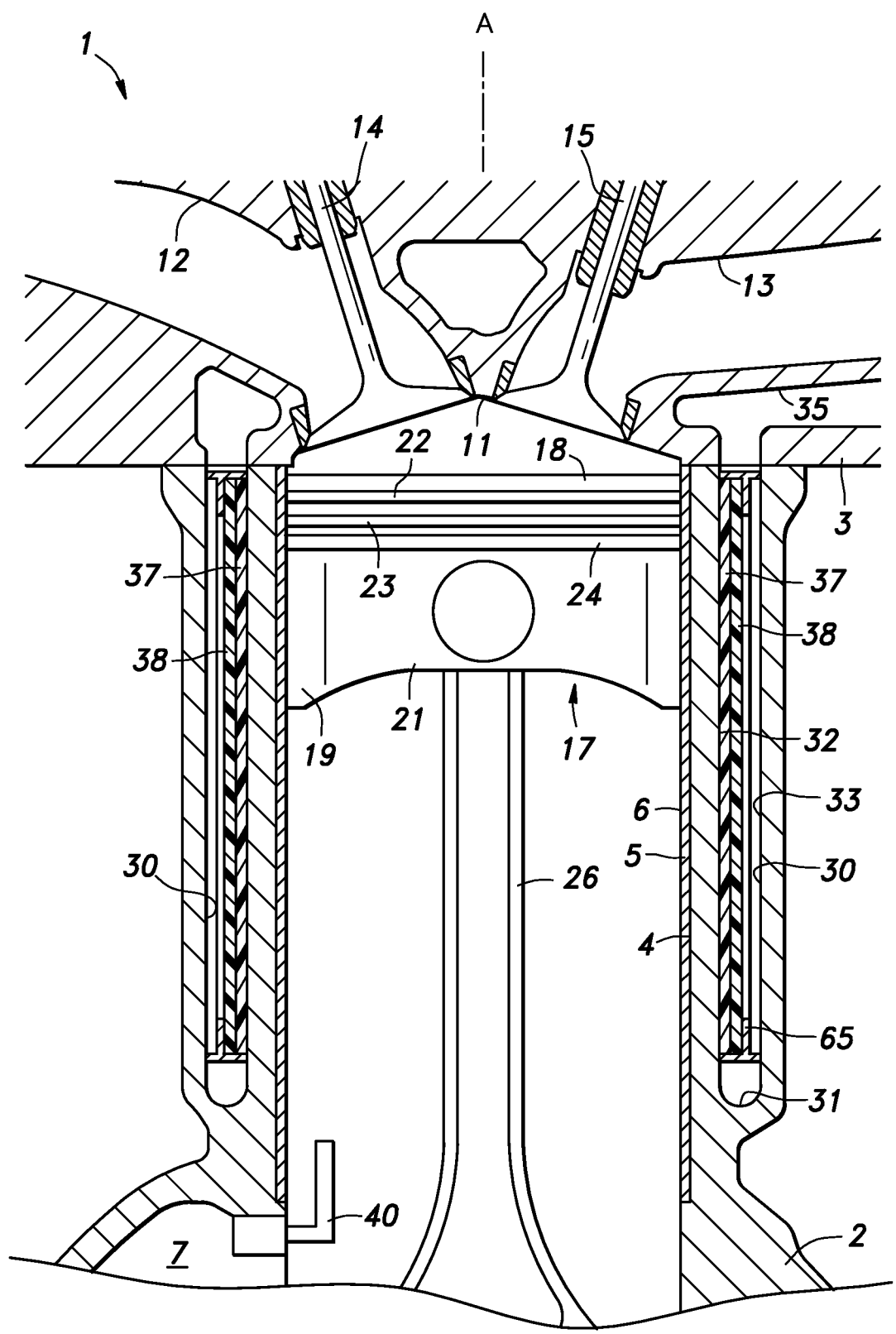
FIG. 6 is a view similar to FIG. 1 showing a modification of the first embodiment.

Although the present invention has been described in terms of specific embodiments, the present invention is not limited by such embodiments, but can be modified in a number of different ways without departing from the spirit of the present invention. For instance, the anisotropic thermal conductivity member 37 can be mounted in different ways from those shown in the illustrated embodiments. For instance, as shown in FIG. 6, a spacer 65 or a standoff member may be placed in the cooling water passage 30 so that the anisotropic thermal conductivity member 37 and the thermally insulating member 38 may be interposed between the spacer 65 and the passage inner wall surface 32. The spacer 65 may consist of a frame member having flanges to keep the spacer 65 in place in the cooling water passage 30, and a large open area to allow the cooling water to freely circulate and contact the outer circumferential surface of the thermally insulating member 38.

It is also possible for the anisotropic thermal conductivity member 37 and the thermally insulating member 38 to be present in only a part of entire circumference of the cylinder 6, instead of extending over the entire circumference thereof as was the case with the foregoing embodiments. For instance, the anisotropic thermal conductivity member 37 and the thermally insulating member 38 may be provided only on the exhaust side and/or the intake side of the cylinder 6.

The invention claimed is:

1. An internal combustion engine, comprising:
   a cylinder block defining a cylinder receiving a piston and a cooling water passage provided radially outwardly of the cylinder;
   an anisotropic thermal conductivity member bonded to a wall surface of the cooling water passage on a side of the cylinder, a thermal conductivity of the anisotropic thermal conductivity member in an axial direction of the cylinder being higher than a thermal conductivity of the anisotropic thermal conductivity member in a radial direction of the cylinder; and
   a thermally insulating member provided on an outer surface of the anisotropic thermal conductivity member with respect to the radial direction of the cylinder.

2. The internal combustion engine according to claim 1, wherein the cooling water passage has a greater length in the axial direction of the cylinder than a stroke length of the piston.

3. The internal combustion engine according to claim 2, wherein the anisotropic thermal conductivity member and the thermally insulating member each have a greater length in the axial direction of the cylinder than the stroke length of the piston.

4. The internal combustion engine according to claim 3, wherein the anisotropic thermal conductivity member and the thermally insulating member each have an upper end located above a top ring of the piston at a top dead center, and a lower end located below the top ring of the piston at a bottom dead center.

5. The internal combustion engine according to claim 1, wherein the thermally insulating member is bonded to the anisotropic thermal conductivity member.

* * * * *